(12) United States Patent
Kulkarni et al.

(10) Patent No.: US 9,531,242 B2
(45) Date of Patent: Dec. 27, 2016

(54) APPARATUSES AND METHODS FOR COOLING ELECTRIC MACHINES

(71) Applicant: TECO-Westinghouse Motor Company, Round Rock, TX (US)

(72) Inventors: Devdatta P. Kulkarni, Austin, TX (US); Gabriel Rupertus, Austin, TX (US); Edward Chen, Austin, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 0 days.

(21) Appl. No.: 13/790,883

(22) Filed: Mar. 8, 2013

(65) Prior Publication Data

US 2014/0183991 A1   Jul. 3, 2014

Related U.S. Application Data

(60) Provisional application No. 61/747,788, filed on Dec. 31, 2012.

(51) Int. Cl.
*H02K 9/19* (2006.01)
*H02K 9/16* (2006.01)
*H02K 5/20* (2006.01)

(52) U.S. Cl.
CPC ........ *H02K 9/16* (2013.01); *H02K 5/20* (2013.01); *H02K 9/19* (2013.01); *Y10T 29/49359* (2015.01)

(58) Field of Classification Search
CPC .............. H02K 9/19; H02K 9/16; H02K 9/00; H02K 5/20

USPC ................................ 310/54, 58, 59, 60 A, 61
See application file for complete search history.

(56) References Cited

U.S. PATENT DOCUMENTS

| | | | |
|---|---|---|---|
| 1,360,483 A * | 11/1920 | Wiard | 310/62 |
| 1,803,570 A * | 5/1931 | Wilhelm | H02K 5/20 |
| | | | 310/62 |
| 2,571,872 A | 10/1951 | Hayes | 171/252 |
| 4,839,547 A | 6/1989 | Lordo et al. | 310/60 |
| 4,864,173 A | 9/1989 | Even | 310/93 |
| 5,019,737 A * | 5/1991 | Bruno | 310/89 |
| 5,560,424 A | 10/1996 | Ogawa | 165/183 |
| 5,869,912 A | 2/1999 | Andrew et al. | 310/52 |
| 6,098,703 A | 8/2000 | Yoshii | 165/153 |
| 6,392,326 B1 | 5/2002 | Turnbull et al. | 310/270 |
| 6,617,715 B1 | 9/2003 | Harris et al. | 310/54 |
| 6,633,097 B2 | 10/2003 | Dunlap et al. | 310/54 |
| 6,777,836 B2 | 8/2004 | Tong et al. | 310/65 |
| 6,815,848 B1 | 11/2004 | Glew | 310/52 |
| 7,591,147 B2 * | 9/2009 | Masoudipour | F25B 31/006 |
| | | | 165/169 |
| 7,663,272 B2 * | 2/2010 | Oyoung | H02K 5/20 |
| | | | 310/54 |
| 8,053,938 B2 | 11/2011 | Pal et al. | 310/52 |
| 8,093,770 B1 | 1/2012 | Berhan | 310/54 |
| 2007/0284954 A1* | 12/2007 | Lin | H02K 9/14 |
| | | | 310/58 |
| 2010/0038981 A1 | 2/2010 | Urano et al. | 310/54 |

* cited by examiner

*Primary Examiner* — Joshua Benitez-Rosario
*Assistant Examiner* — Leda Pham
(74) *Attorney, Agent, or Firm* — Norton Rose Fulbright US LLP

(57) ABSTRACT

Cooling apparatuses and methods comprising cooling apparatuses, such as those configured to be coupled to and/or cool electric machines (e.g., motors, generators, and the like).

16 Claims, 7 Drawing Sheets

APPARATUSES AND METHODS FOR COOLING ELECTRIC MACHINES

CROSS-REFERENCE TO RELATED APPLICATIONS

This application claims priority to U.S. Provisional Patent Application No. 61/747,788, filed Dec. 31, 2012, which is incorporated by reference in its entirety.

BACKGROUND

1. Field of the Invention

The present invention relates generally to cooling apparatuses, and more particularly, but not by way of limitation, to cooling apparatuses and methods comprising cooling apparatuses configured to be coupled to and/or cool electric machines (e.g., motors, generators, and the like).

2. Description of Related Art

Examples of cooling apparatuses are shown in, for example, U.S. Pat. Nos. 4,839,547; 4,864,173; 5,560,424; 6,098,703; and 6,825,848.

SUMMARY

This disclosure includes embodiments of cooling apparatuses and methods comprising cooling apparatuses configured to be coupled to and/or cool electric machines (e.g., motors, generators, and the like).

Some embodiments of the present cooling apparatuses comprise a frame configured to receive at least a portion of an electric machine, the frame having a first end, a second end, an inner wall, and an outer wall configured to cooperate with the inner wall to define an annular chamber between the outer and inner walls, the chamber configured to permit a fluid to move between the outer and inner walls; longitudinal ribs forming flow channels within the annular chamber; and a breaker disposed in and spanning one of the flow channels, the breaker configured to disturb flow when fluid flows through the flow channel in which the breaker is disposed.

Some embodiments of the present cooling apparatuses comprise a frame configured to receive at least a portion of an electric machine, the frame having a first end, a second end, an inner wall, and an outer wall configured to cooperate with the inner wall to define an annular chamber between the outer and inner walls, the chamber configured to permit a fluid to move between the outer and inner walls; longitudinal ribs forming flow channels within the annular chamber; and a corrugated fin disposed in a flow channel, the corrugated fin configured to define sub-channels extending longitudinally through the flow channel in which it is disposed.

Some embodiments of the present methods comprise disposing a corrugated fin between a pair of longitudinal ribs in a plurality of longitudinal ribs, where the plurality of longitudinal ribs are coupled to an inner wall of a frame; coupling a bar to the pair of longitudinal ribs to prevent the corrugated fin from moving away from the inner wall of the frame; and coupling an outer wall to at least one of the bar and the pair of longitudinal ribs.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a cooling apparatus, or a component of a cooling apparatus that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the present cooling apparatuses and methods can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures illustrate the described elements using graphical symbols that will be understood by those of ordinary skill in the art. The embodiments of the present cooling apparatuses and their components shown in the figures are drawn to scale.

DESCRIPTION OF ILLUSTRATIVE EMBODIMENTS

Figure 1A:
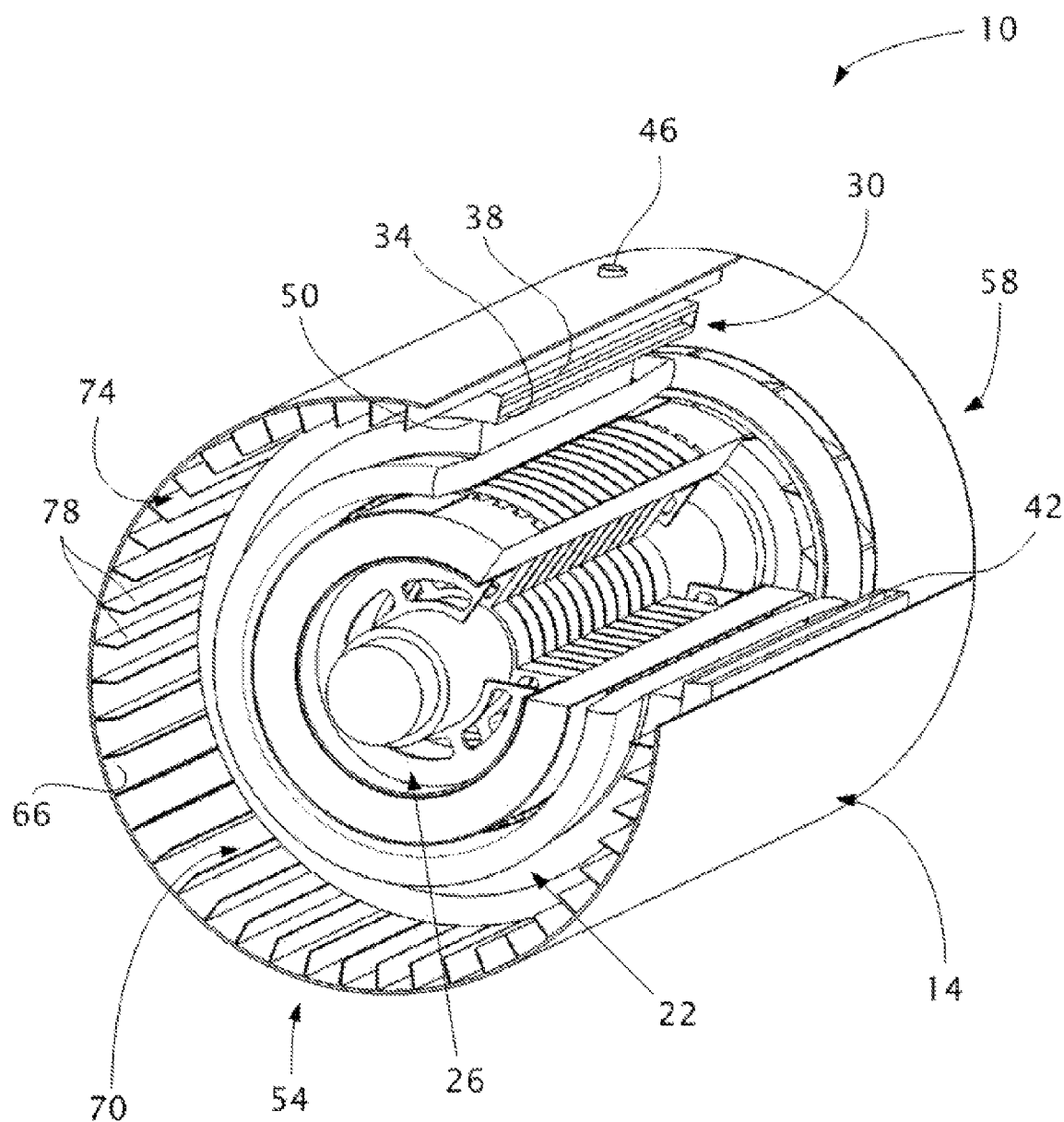
FIG. 1A depicts a perspective view of one embodiment of a cooling apparatus coupled to an electric machine.
Figure 1B:
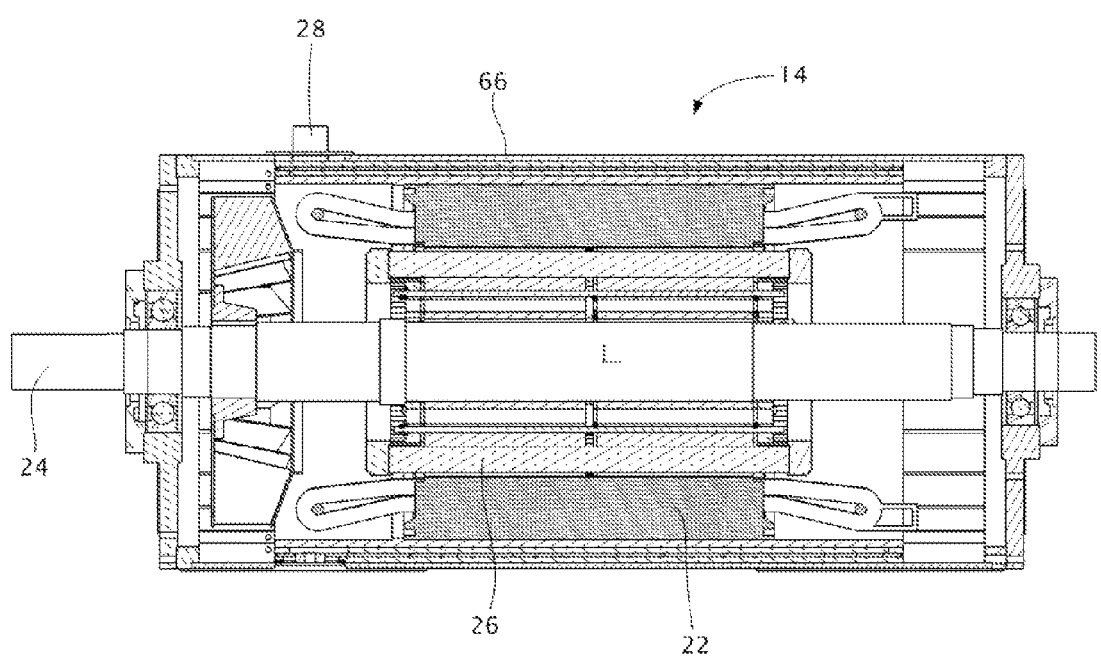
FIG. 1B depicts a cross-sectional view of the cooling apparatus and electric machine of FIG. 1A.
Figure 1C:
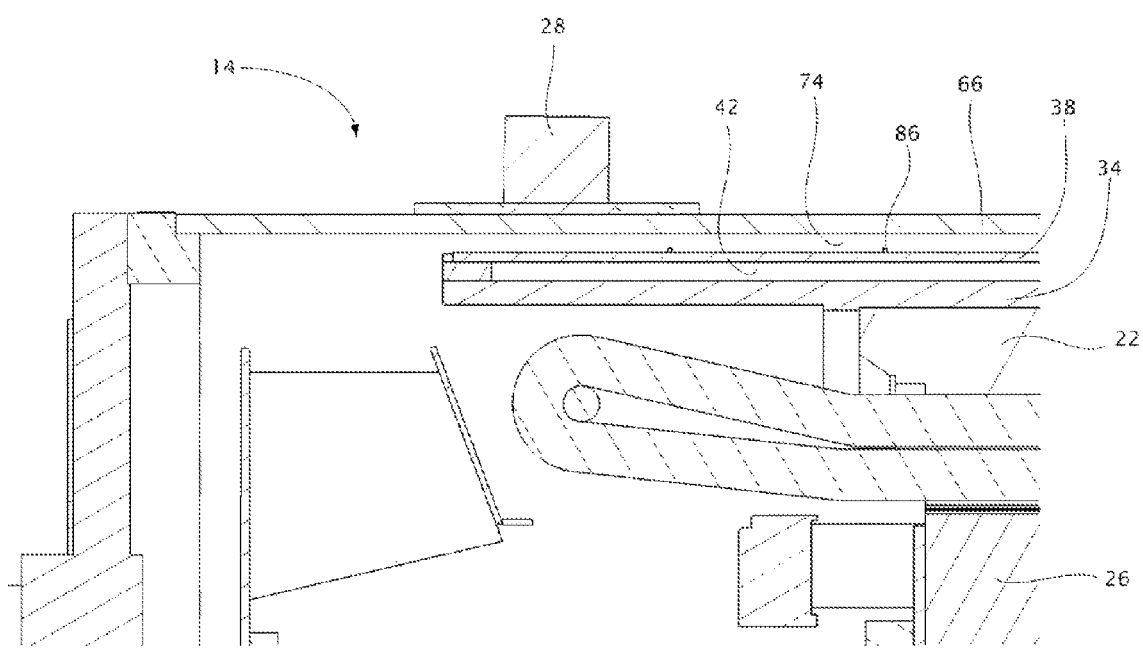
FIG. 1C depicts a detailed view of a portion of the cooling apparatus and electric machine of FIG. 1A.

Referring now to the drawings, and more particularly to FIGS. 1A-1C, there is shown cooling apparatus 10, one embodiment of the present cooling apparatuses. Cooling apparatus 10 comprises frame 14 configured to be coupled to an electric machine (e.g., a motor, a generator, and the like). More specifically, frame 14 is configured to receive at least a portion of an electric machine. Cooling apparatus 10 is configured, for example, to increase a power density of an electric machine (e.g., by lowering an operating temperature of the electric machine to permit the machine to operate at a higher power level without overheating). In the embodiment shown, cooling apparatus 10 is coupled to electric machine 18, which comprises stator 22, shaft 24, and rotor 26. Frame 14 of cooling apparatus 10 can be coupled to electric machine 18 by any suitable coupling device configured to prevent frame 14 from moving away from stator 22 and/or to prevent frame 14 from moving longitudinally with respect to stator 22. For example, and not by way of limitation, cooling apparatus 10 can be coupled to an electric machine (e.g., electric machine 18) by bolts, screws, clamps, shrink fit pressures, and/or welds.

Figure 1D:
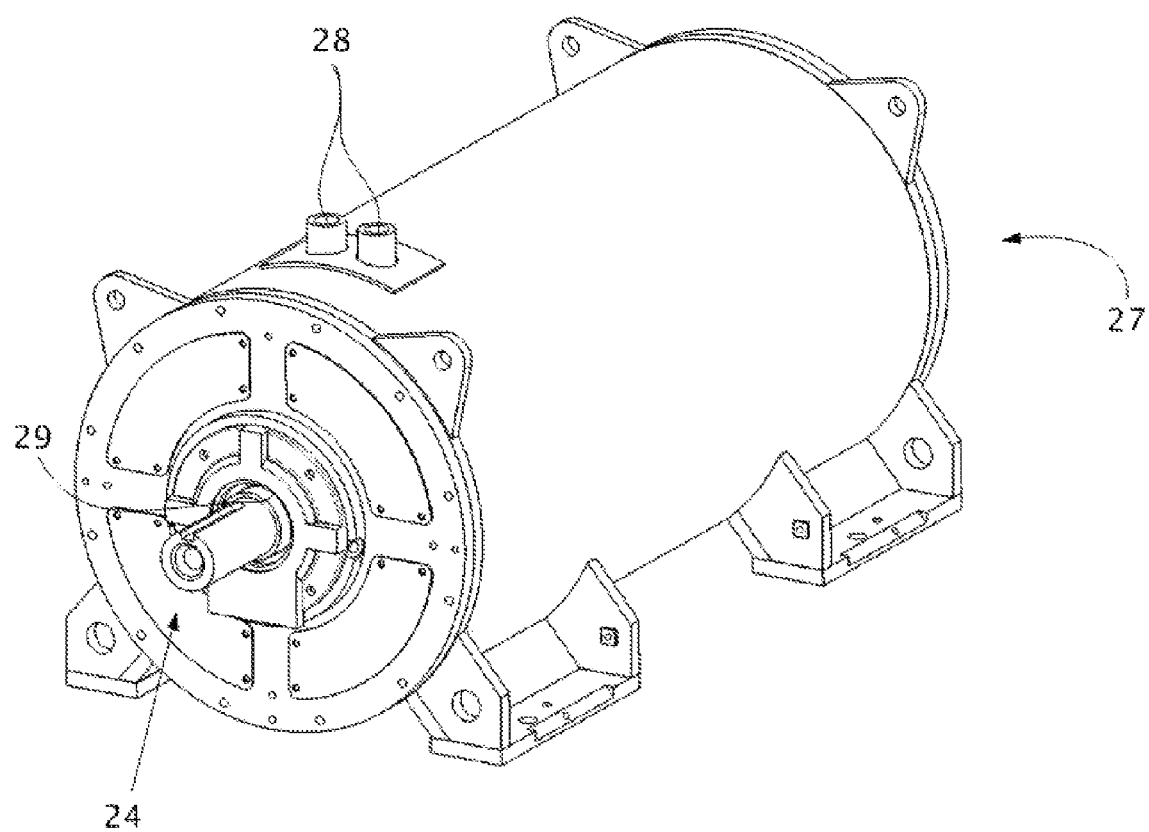
FIG. 1D depicts the cooling apparatus and electric machine of FIG. 1A at least partially disposed in a casing.

As shown in FIG. 1D, cooling apparatus 10 and electric machine 18 can be disposed at least partially within casing 27. Casing 27 can have a substantially similar shape to cooling apparatus 10 and/or electric machine 18 (e.g., cylindrical, in the embodiment shown). In other embodiments, casing 27 can comprise any suitable shape configured to at least partially receive cooling apparatus 10 and/or electric machine 18 (e.g., rectangular, square, etc.). In the embodiment shown, casing 27 comprises openings 28. Openings 28 are configured to permit a fluid (e.g., air, water, and/or the like) to enter and/or exit casing 27. Further, casing 27 comprises shaft opening 29 configured to permit at least a portion of shaft 24 to extend through shaft opening 29 such that at least a portion of shaft 24 is exterior to casing 27.

In the embodiment shown, frame 14 of cooling apparatus 10 comprises and/or is coupled to jacket 30 (e.g., a water jacket). In the embodiment shown, jacket 30 has a substantially cylindrical configuration and includes jacket inner wall 34, the exterior of which defines an open region configured to accommodate at least a portion of electric machine 18. Jacket 30 further comprises jacket outer wall 38. Jacket inner and outer walls 34 and 38 cooperate to define jacket chamber 42 between jacket inner and outer walls 34 and 38. At least one of jacket inner and outer walls 34 and 38 include at least one inlet 46 through which a first fluid (e.g., water) can move into jacket chamber 42 to permit the first fluid to move between jacket inner and outer walls 34 and 38. In some embodiments, inlet 46 is unitary with one of openings 28 of casing 27 (e.g., comprising the same piece of material); and in other embodiments, inlet 46 is coupled to one of openings 28 of casing 27 (e.g., such that inlet 46 and one of openings 28 are in fluid communication).

Jacket 30 is configured to be coupled to and/or contact exterior surface 50 of stator 22 to permit heat transfer from stator 22 through jacket inner wall 34 to a first fluid within jacket chamber 42. In the embodiment shown, jacket 30 is configured to permit heat from stator 22 to pass through jacket inner wall 34 to a first fluid moving within jacket chamber 42. Cooling apparatus 10 and/or devices cooperating with cooling apparatus 10 (e.g., a pump) can be configured to move a first fluid through jacket chamber 42 to maintain a sufficient temperature gradient between the first fluid and stator 22 and/or to achieve a desired heat transfer from stator 22 to the first fluid.

In the embodiment shown, cooling apparatus 10 and/or jacket 30 is configured to cool stator 22 and other components of electric machine 18 (e.g., rotor 26, stator winding end turns, etc.). For example, cooling apparatus 10 is configured such that a second fluid (e.g., internal air of electric machine 18) can move over other components of electric machine 18 to permit heat to transfer from the other components of electric machine 18 to the second fluid (e.g., due to a temperature gradient between the first fluid and the other components of electric machine 18). Cooling device 10 can also be configured to move the second fluid (e.g., internal air of electric machine 18) over jacket outer wall 38 of jacket 30 to permit heat to transfer from the second fluid through jacket outer wall 38 to a first fluid (e.g., water) within jacket chamber 42 (e.g., due to a temperature gradient between the first and second fluid) in order to, for example, cool the second fluid to a lower temperature.

In the embodiment shown, frame 14 comprises first end 54, second end 58, an inner wall, an outer wall, and ribs disposed between the inner and outer walls. In the embodiment shown, the inner wall of frame 14 and jacket outer wall 38 are unitary (e.g., formed of the same piece of material). In some embodiments, an inner wall of frame 14 can be distinct from and/or coupled to jacket outer wall 38. In the embodiment shown, frame 14 further comprises outer wall 66 that is configured to cooperate with (e.g., is disposed around and/or concentric with) the inner wall of frame 14. Frame 14's inner wall (e.g., jacket outer wall 38, in the embodiment shown) can comprise one piece (e.g., a unitary structure) or more than one piece. Outer wall 66 of frame 14 also can comprise one piece (e.g., as depicted in FIG. 1A) or more than one piece.

Frame 14 includes an open region between first end 54 and second end 58 that is configured to receive at least a portion of electric machine 18. In some embodiments, the open region is defined at least in part by both the inner and outer walls of the frame. For example, in the embodiment shown in FIG. 1A, outer wall 66 of frame 14 extends beyond the frame's inner wall (jacket outer wall 38) to (or at least toward) first end 54 such that the inner wall only defines a portion of the open region, and outer wall 66 defines another portion of the open region. In other embodiments, the frame's inner wall and its outer wall can both extend to first end 54 and/or second end 58 of frame 14 such that the inner wall defines all (or at least substantially all) of the open region.

In the embodiment shown, the inner wall and outer wall 66 of frame 14 cooperate to define annular chamber 74, which is configured to permit a second fluid to move between the inner wall and outer wall 66 of frame 14 such that heat can transfer from the second fluid through the inner wall (e.g., jacket outer wall 38, in the embodiment shown) to a first fluid moving within jacket chamber 42 (e.g., due to a temperature gradient between the first and second fluids).

In the embodiment shown, frame 14 also comprises a plurality of ribs 78. Ribs 78 are disposed longitudinally with respect to frame 14 and form a plurality of flow channels 82 (e.g., defined by two adjacent ribs of plurality of ribs 78) within annular chamber 74. Ribs 78 can be coupled (e.g., by welds) to the inner wall (e.g., jacket outer wall 38, in the embodiment shown) and/or outer wall 66 of frame 14. In the embodiment shown, ribs 78 are coupled substantially perpendicular to the inner wall (e.g., jacket outer wall 38) and/or outer wall 66 of frame 14; in other embodiments, ribs 78 can be coupled to the inner wall and/or outer wall 66 of frame 14 at an angle (e.g., depending on a desired flow channel volume, a desired fluid path within a flow channel, etc.). In some embodiments, ribs 78 can be unitary with the inner wall and/or outer wall 66 of frame 14 (e.g., formed of the same piece of material). Ribs 78 can also be configured to span the distance from the inner wall to outer wall 66 of frame 14, such that—in the axial area bordered by both the inner wall and outer wall 66 of frame 14—adjacent airflow channels of plurality of airflow channels 82 do not fluidly communicate with one another. Further, in the embodiment shown, ribs 78 extend between first end 54 and second end 58 of frame 14 (e.g., beyond the inner wall (e.g., jacket outer wall 38) of frame 14). In other embodiments, ribs 78 can extend less than a length from first end 54 to second end 58 (e.g., ribs 78 can extend a length equal to a length of the inner wall of frame 14, where the inner wall does not extend to first end 54 and/or second end 58 of frame 14).

Figure 2:
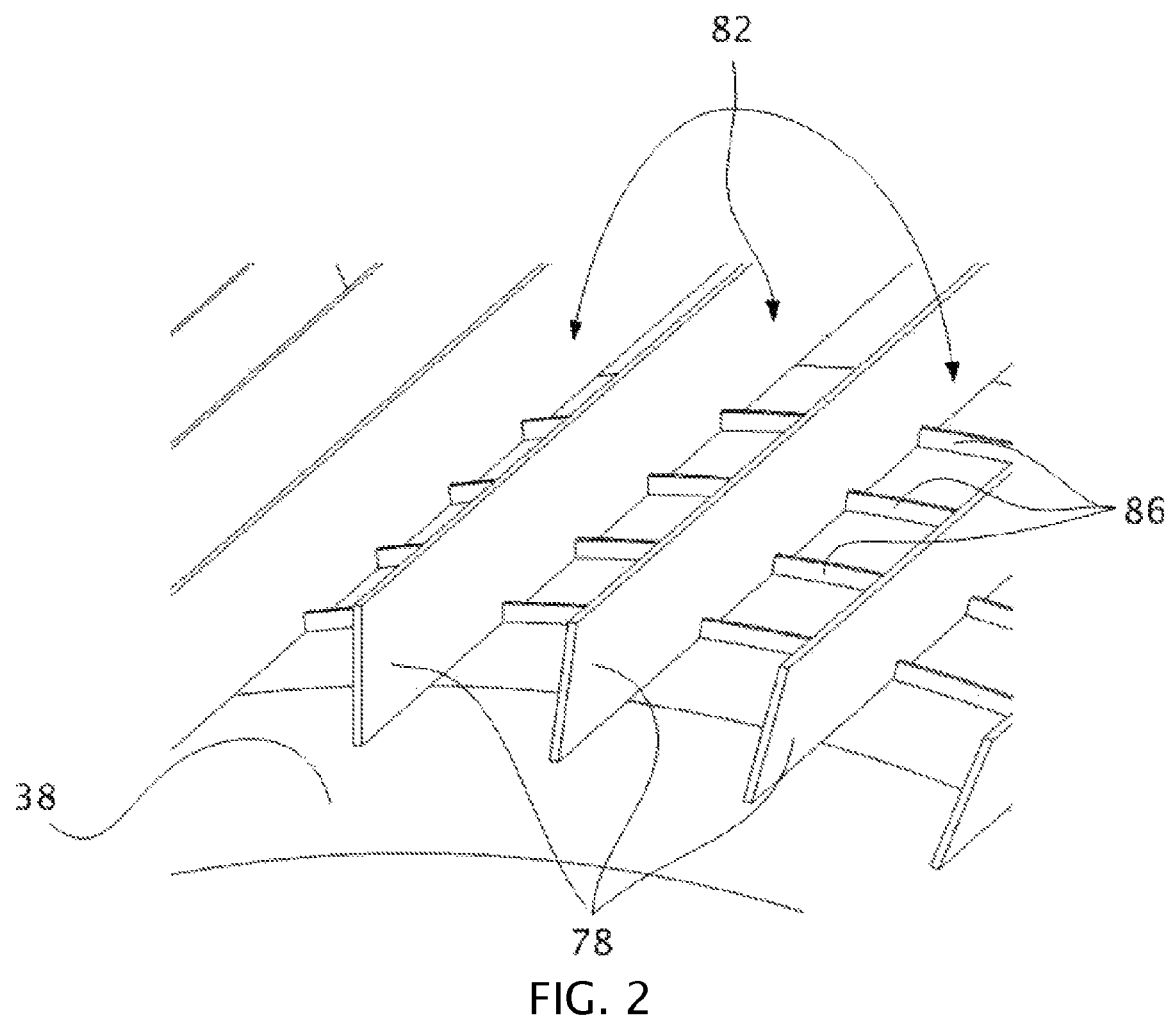
FIG. 2 depicts a perspective view of a portion of the cooling apparatus and electric machine of FIG. 1A, showing that the cooling apparatus includes at least one breaker.

FIGS. 1C and 2 depict one embodiment of cooling apparatus 10. Frame 14 of cooling apparatus 10 can comprise at least one breaker 86 disposed in flow channels 82. In the embodiment shown, frame 14 has a plurality of breakers 86. In the embodiment shown, breakers 86 are— but are not required to be—disposed in each flow channel of the plurality of flow channels 82. In the embodiment shown, breakers 86 span respective flow channels of the plurality of flow channels 82 (e.g., such that plurality of breakers 86 extend a distance between adjacent ribs of the plurality of ribs 78). In some embodiments, at least one breaker 86 is coupled to (e.g., by welds) an inner wall of frame 14 (e.g., jacket outer wall 38). In other embodiments, at least one breaker 86 is unitary with the inner wall of frame 14 (e.g., formed of the same piece of material). In still other embodiments, at least one breaker 86 can be coupled to and/or unitary with adjacent ribs of the plurality of ribs 78 such that at least one breaker 86 is in contact with the inner wall of frame 14.

At least one breaker 86 is configured to disturb flow (e.g., the breaker is configured to disturb the flow boundary layer) when a second fluid flows through plurality of flow channels 82. Disturbing flow (e.g., by disturbing the flow boundary layer) when a second fluid flows over at least one breaker 86 and the inner wall of frame 14 (e.g., jacket outer wall 38) can increase a heat transfer coefficient of the second fluid (e.g., near the inner wall of frame 14), and, thus, can increase heat transfer from the second fluid through the inner wall of frame 14 to a first fluid within jacket chamber 42 of jacket 30. For example, at least one breaker 86 can be configured to produce turbulent flow, vortices, and/or eddies (e.g., by disturbing the fluid boundary layer) when a second fluid flows through a respective flow channel 82.

At least one breaker 86 can be configured and/or oriented in various ways to produce a desired flow disturbance. For example, in the embodiment shown, breakers 86 span respective flow channels perpendicularly to a direction of flow. In other embodiments, at least one breaker 86 can span a respective flow channel at a non-perpendicular angle (e.g., 15, 30, 45, 60 degrees, etc.) with respect to a direction of flow (e.g., depending on a desired flow disturbance, a desired heat transfer coefficient of a second fluid moving over at least one breaker 86, etc.). Each breaker 86 can have a height with respect to the inner wall of frame 14 (e.g., jacket outer wall 38). A height of at least one breaker 86 can be configured to minimize a drop in pressure and/or minimize a resistance to flow when a second fluid moves through a respective flow channel 82. A height of at least one breaker 86 can be expressed as a percentage of a height of adjacent ribs of the plurality of ribs 78. For example, a height of at least one breaker can be 1% to 10% of the height of adjacent ribs of the plurality of ribs 78. A height of at least one breaker 86 with respect to the inner wall of frame 14 can be selected depending on, for example, a desired flow disturbance, a desired heat transfer coefficient of a second fluid moving over at least one breaker 86, and the like.

In the embodiment shown, breakers 86 are disposed substantially perpendicular to the inner wall of frame 14. However, in other embodiments, at least one breaker 86 can be disposed at a non-perpendicular angle (e.g., 30, 60, 120, 150 degrees) with respect to the inner wall of frame 14 (e.g., depending on a desired flow disturbance, a desired heat transfer coefficient of a second fluid moving over at least one breaker 86, etc.). Further, cooling apparatus 10 can have any number of breakers in a given flow channel, such as, for example, 1, 5, 10, 15, or more breakers (e.g., depending on a desired flow disturbance, a desired heat transfer coefficient of a second fluid moving over at least one breaker 86, etc.). Additionally, at least one breaker 86 can be configured in other suitable ways to affect a desired flow disturbance, a desired heat transfer coefficient of a second fluid moving over at least one breaker 86, a desired boundary layer thickness, and the like, such as, for example, by varying the roughness and/or material of at least one breaker 86 and/or varying the configuration of an end of at least one breaker 86 over which a second fluid moves.

FIGS. 3A-3D depict further embodiments of the present cooling apparatuses. In each of the embodiments shown in these figures, the cooling apparatus (which otherwise has features and components of cooling apparatus 10) comprises corrugated fin 90 disposed in the plurality of flow channels 82 between adjacent ribs of the plurality of ribs 78. Corrugated fin 90 is configured to contact adjacent ribs of the plurality of ribs 78 and the inner wall of frame 14 (e.g., jacket outer wall 38, in the embodiment shown). When corrugated fin 90 is disposed in the plurality of flow channels 82, a surface area in contact with a second fluid moving through the plurality of flow channels 82 increases, and, thus, heat transfer can increase from the second fluid to a first fluid moving within jacket chamber 42 (e.g., by moving through corrugated fin 90, adjacent ribs of plurality of ribs 78, and/or the inner wall of frame 14).

Corrugated fin 90 can be—but is not required to be— disposed in each flow channel of flow channels 82. In some embodiments, corrugated fin 90 can extend a majority of a length of a respective flow channel; in other embodiments, corrugated fin 90 can extend less than a majority of a length of a respective flow channel (e.g., depending on a desired surface area of corrugated fin 90 in contact with a second fluid moving through a respective flow channel). In the embodiment shown, corrugated fin 90 is configured to define a plurality of sub-channels 94 extending longitudinally with respect to a respective flow channel of the plurality of flow channels 82. In the embodiment shown, corrugated fin 90 has approximately six folds 98 configured to define approximately six to eight sub-channels 94. In other embodiments, corrugated fin 90 can comprise more or less folds and/or sub-channels (e.g., to minimize a resistance to a second fluid moving through flow channels 82, to achieve a desired surface area of corrugated fin 90 in contact with adjacent ribs, the inner wall of frame 14, and/or a second fluid moving through a respective flow channel, and the like).

Figure 3A:
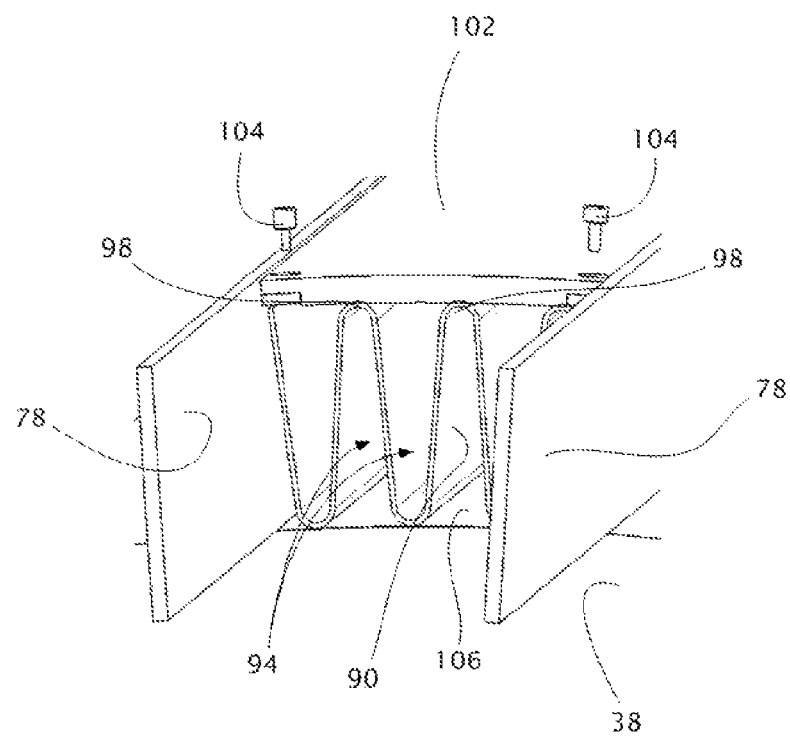
FIGS. 3A-3D depict perspective views of portions of other embodiments of the present cooling apparatuses, which have corrugated fins.
Figure 3B:
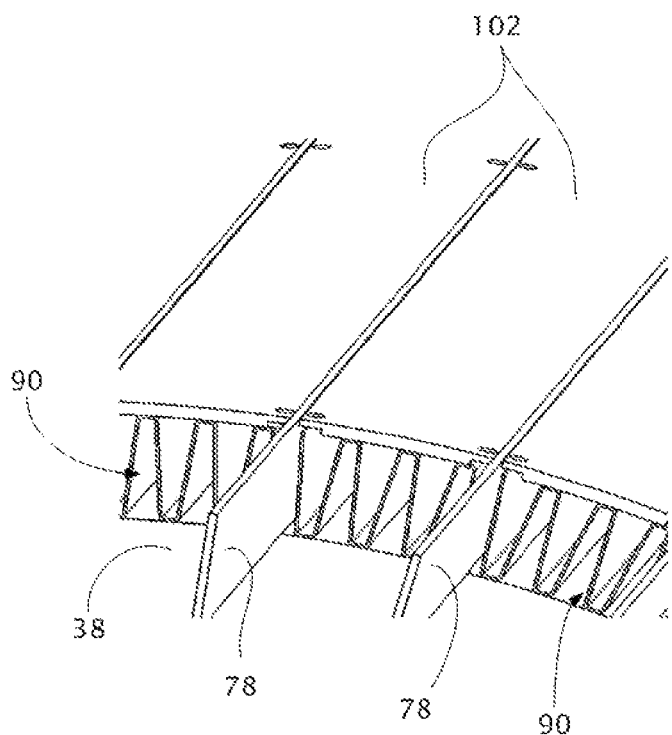

In the embodiment shown in FIGS. 3A and 3B, the cooling apparatus further comprises bar 102 configured to be coupled (e.g., by one or more bolts 104) to adjacent ribs of the plurality of ribs 78 to prevent corrugated fin 90 from moving away from the inner wall of frame 14 (e.g., jacket outer wall 38). In the embodiment shown, bar 102 is further configured to compress corrugated fin 90 with respect to the inner wall of frame 14 (e.g., to prevent corrugated fin 90 from moving away from the inner wall and/or in order to increase an area of contact between corrugated fin 90 and the inner wall and/or adjacent ribs). In this embodiment, the outer wall of frame 14 comprises multiple pieces: bars 102 and (the outer edges of) ribs 78.

Figure 3C:
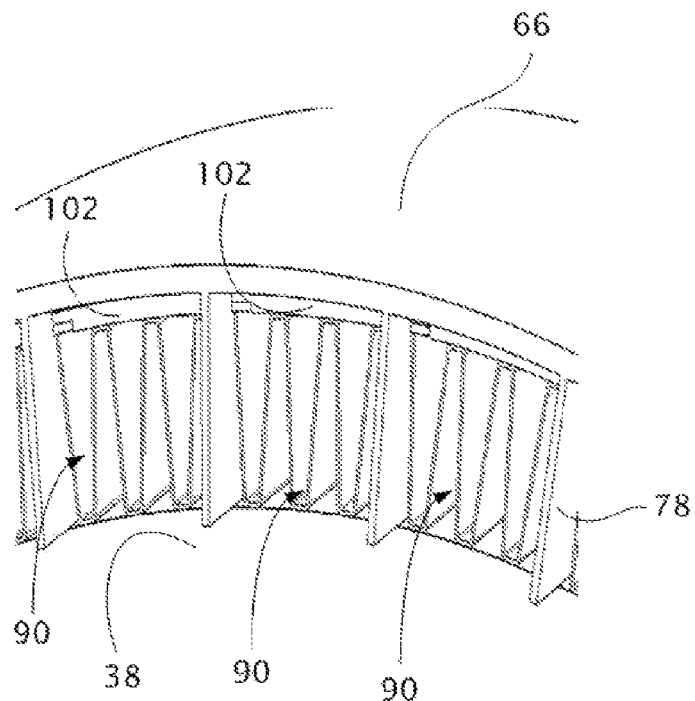
Figure 3D:
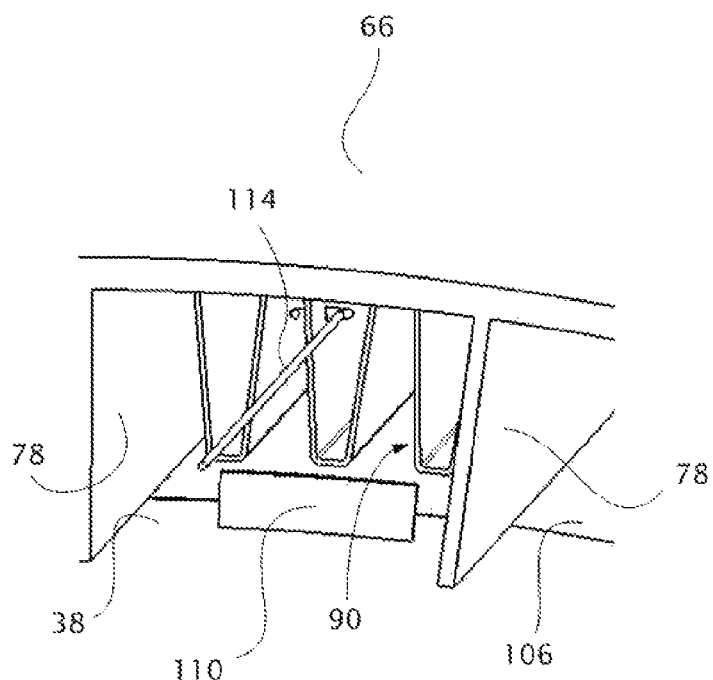

In the embodiment shown in FIGS. 3C-3D, the outer wall of the frame is outer wall 66, which comprises a single piece of material. Furthermore, in some embodiments, outer wall 66 of frame 14 can be disposed over bars 102 and coupled to bars 102 and/or adjacent ribs of the plurality of ribs 78. This embodiment also shows that the present cooling apparatus can comprise—but are not required to comprise—thermal interface material 106 disposed on the inner wall of frame 14 (e.g., jacket outer wall 38) in the plurality of flow channels 82. Thermal interface material 106 can increase conductivity and/or thermal contact between corrugated fin 90 and inner wall 106, and can include, for example, thermal greases (e.g., silicone-based greases, sodium silicate-based greases, polyethylene glycol-based greases, etc.), resilient thermal conductors (e.g., conducting particle filled elastomers), solder, thermal fluids (e.g., mineral oil), and the like. In some embodiments, thermal interface material 106 can have a high fluidity to minimize a thickness of thermal interface material 106 after being disposed on the inner wall of frame 14 (e.g., to minimize resistance to a second fluid flowing through plurality of flow channels 82). In other embodiments, thermal interface material 106 can have a high filler content to, for example, increase thermal conductivity between corrugated fin 90 and the inner wall of frame 14.

In the embodiment shown in FIG. 3D, the cooling apparatus includes stopper 110, which is coupled to the inner wall of frame 14 (e.g., jacket outer wall 38) and is configured to prevent longitudinal movement of corrugated fin 90 with respect to a flow channel of the plurality of flow channels 82. In other embodiments, stopper 110 can be coupled to at least one of adjacent ribs of the plurality of ribs 78, bar 102, and/or outer wall 66 to prevent longitudinal movement of corrugated fin 90 in a respective flow channel of the plurality of flow channels 82. Multiple stoppers 110 can be used in this way around the circumference of the cooling apparatus.

Components of embodiments of the present cooling apparatuses (e.g., frame 14, jacket 30, the inner wall of frame 14 (e.g., jacket outer wall 38), outer wall 66 of frame 14, plurality of ribs 78, at least one breaker 86, corrugated fin 90, etc.) can comprise various thermally conductive materials (e.g., metals and non-metals) configured to improve heat transfer through components of the respective cooling apparatus and/or between a second fluid moving within annular chamber 74 and a first fluid moving within jacket chamber 42, including, but not limited to, steel, carbon steel, aluminum, copper, and combinations and/or alloys thereof. In other embodiments, however, at least one breaker 86 and/or corrugated fin 90 can comprise a material or materials of lower conductivity. Further, at least one breaker 86 and/or corrugated fin 90 can comprise thin, light weight, and/or low density materials to improve heat transfer, minimize weight, and/or reduce resistance to a second fluid moving through one or more of the plurality of flow channels 82.

Some embodiments of the present methods include methods of disposing a corrugated fin (e.g., corrugated fin 90) in a flow channel. In one embodiment, a method can include disposing a corrugated fin (e.g., corrugated fin 90) between adjacent ribs of longitudinal ribs (e.g., the plurality of ribs 78), where the longitudinal ribs are coupled to an inner wall (e.g., jacket outer wall 38) of a frame (e.g., frame 14); coupling a bar (e.g., bar 102) to adjacent ribs (e.g., with a bolt) to prevent the corrugated fin (or fins) from moving away from the inner wall of the frame; and coupling an outer wall (e.g., outer wall 66) to at least one of the bar and the adjacent ribs. Multiple corrugated fins may be individually disposed between adjacent ribs of the longitudinal ribs, and the method can further include compressing the corrugated fin or fins with respect to the inner wall of the frame. The method can also include disposing a thermal interface material (e.g., thermal interface material 106) on the inner wall of the frame prior to disposing the corrugated fin or fins between adjacent ribs of the longitudinal ribs.

Another embodiment of the present methods can include coupling at least one of a bar (e.g., bar 102) and an outer wall (e.g., outer wall 66) to adjacent ribs of longitudinal ribs (e.g., the plurality of ribs 78), where the longitudinal ribs are coupled to an inner wall (e.g., jacket outer wall 38) of a frame (e.g., frame 14); and pulling one or more corrugated fins through each of a plurality of flow channels (e.g., plurality of flow channels 82) defined by the longitudinal ribs with a pulling device (e.g., hooking device 114). The method can further comprise disposing a thermal interface material (e.g., thermal interface material 106) on the inner wall of the frame prior to pulling the one or more corrugated fins through each of the plurality of flow channels. The method can also include compressing the corrugated fins with respect to the inner wall of the frame prior to the pulling. Further, the method can include coupling a stopper (e.g., stopper 110) to at least one of the inner wall, the outer wall, and/or adjacent ribs and within the plurality of flow channels such that the stopper prevents longitudinal movement of the corrugated fin or fins within the respective flow channel.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A cooling apparatus comprising:
a frame configured to receive at least a portion of an electric machine that includes a stator, the frame having:
a first end,
a second end, and:
an inner wall; and
an outer wall configured to cooperate with the inner wall to define an annular chamber between the outer and inner walls, the chamber configured to permit a fluid to move between the outer and inner walls;
longitudinal ribs forming flow channels within the annular chamber;
a breaker disposed in and spanning one of the flow channels such that the breaker is non-parallel to that flow channel, the breaker configured to disturb flow when fluid flows through the flow channel in which the breaker is disposed; and
a jacket positioned radially inside of the chamber of the frame, the jacket comprising a jacket inner wall configured to contact the stator and permit heat transfer directly therebetween, a jacket chamber outer wall that comprises the inner wall of the frame, and a jacket chamber configured to permit a second fluid to flow therethrough;
where the outer wall of the frame includes an inlet connected to the jacket chamber and through which the second fluid can move into the jacket chamber.

2. The cooling apparatus of claim 1, where a breaker is disposed in and spans each of the other flow channels, each breaker configured to disturb flow when fluid flows through the flow channel in which the breaker is disposed.

3. The cooling apparatus of claim 2, where respective pairs of longitudinal ribs define each flow channel in which a breaker is disposed, at least one of the longitudinal ribs in a given pair of longitudinal ribs has a longitudinal rib height, and each breaker has a height that is 1 to 10 percent of the longitudinal rib height of the at least one of the longitudinal ribs that define the flow channel in which that breaker is disposed.

4. The cooling apparatus of claim 1, where multiple breakers are disposed in and span each of the other flow channels, each breaker configured to disturb flow when fluid flows through the flow channel in which it is disposed.

5. The cooling apparatus of claim 4, where respective pairs of longitudinal ribs define each flow channel in which a breaker is disposed, at least one of the longitudinal ribs in a given pair of longitudinal ribs has a longitudinal rib height, and each breaker has a height that is 1 to 10 percent of the longitudinal rib height of the at least one of the longitudinal ribs that define the flow channel in which that breaker is disposed.

6. The cooling apparatus of claim 1, where two of the longitudinal ribs define the flow channel in which the breaker is disposed, one of the two longitudinal ribs has a longitudinal rib height, and the breaker has a height that is 1 to 10 percent of the longitudinal rib height.

7. A cooling apparatus comprising:
a frame configured to receive at least a portion of an electric machine that includes a stator, the frame having:
a first end,
a second end, and:
an inner wall; and
an outer wall configured to cooperate with the inner wall to define an annular chamber between the outer and inner walls, the chamber configured to permit a fluid to move between the outer and inner walls;
longitudinal ribs forming flow channels within the annular chamber;
a corrugated fin disposed in a flow channel, the corrugated fin configured to define sub-channels extending longitudinally through the flow channel in which it is disposed; and
a jacket positioned radially inside of the chamber of the frame, the jacket comprising a jacket inner wall configured to contact the stator and permit heat transfer directly therebetween, a jacket outer wall that comprises the inner wall of the frame, and a jacket chamber configured to permit a second fluid to flow therethrough;
where the outer wall of the frame includes an inlet connected to the jacket chamber and through which the second fluid can move into the jacket chamber.

8. The cooling apparatus of claim 7, where a corrugated fin is disposed in each of the flow channels, each corrugated fin configured to define sub-channels extending longitudinally through the respective flow channel in which it is disposed.

9. The cooling apparatus of claim 8, further comprising:
a bar configured to be disposed over each of the flow channels and further configured to prevent each of the corrugated fins from moving away from the inner wall of the frame.

10. The cooling apparatus of claim 9, where the bar is coupled to respective pairs of longitudinal ribs that form each of the flow channels such that the bar compresses the respective corrugated fin with respect to the inner wall of the frame.

11. The cooling apparatus of claim 8, further comprising:
a thermal interface material disposed on the inner wall of the frame in each of the flow channels to increase conductivity between the respective corrugated fin and the inner wall.

12. The cooling apparatus of claim 8, further comprising:
at least one stopper coupled to at least one of the inner wall and the outer wall of the frame and configured to prevent longitudinal movement of each of the corrugated fins in the respective flow channel.

13. The cooling apparatus of claim 7, further comprising:
a bar configured to be disposed over the flow channel in which the corrugated fin is disposed, the bar further configured to prevent the corrugated fin from moving away from the inner wall of the frame.

14. The cooling apparatus of claim 13, where the bar is coupled to a pair of longitudinal ribs such that the bar compresses the corrugated fin with respect to the inner wall of the frame.

15. The cooling apparatus of claim 7, further comprising:
a thermal interface material disposed on the inner wall of the frame in the flow channel to increase conductivity between the corrugated fin and the inner wall.

16. The cooling apparatus of claim 7, further comprising:
at least one stopper coupled to at least one of the inner wall and outer wall of the frame and configured to prevent longitudinal movement of the corrugated fin in the flow channel.

* * * * *